Aug. 12, 1930.                K. SCHMIDT                1,772,963
                           ANTILEAKAGE DEVICE
                         Filed Dec. 19, 1927
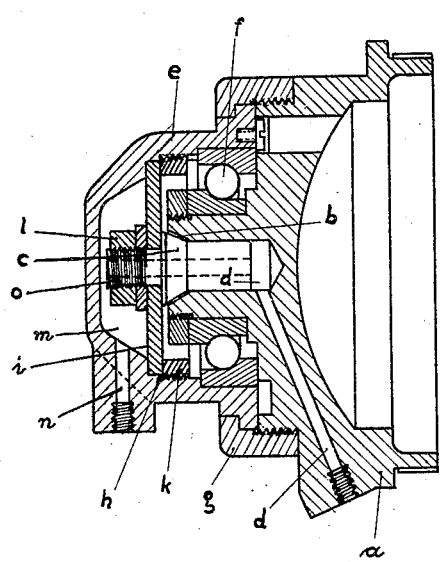
Inventor:
Kurt Schmidt
By: Marks & Clerk
            Attys.

Patented Aug. 12, 1930

1,772,963

UNITED STATES PATENT OFFICE

KURT SCHMIDT, OF WERNIGERODE-ON-THE-HARZ, GERMANY

ANTILEAKAGE DEVICE

Application filed December 19, 1927, Serial No. 241,218, and in Germany December 23, 1926.

This invention has reference to means for preventing leakage of rotatable parts of wheel hubs and in particular to means used in connection with inflatable tires which are charged with air from the center or hub of the wheel, without however being restricted to this particular use, and it is intended to provide means of obtaining a better closure than it was possible with the means heretofore in use. In accordance with this invention a closing or tightening member is forced against the closing or tightening surface when inflating the tire or upon the testing of the pressure prevailing in the tire. Broadly considered the objects referred to are accomplished by connecting the closing or tightening member with a diaphragm, the parts being so arranged that the tightening member or plug is automatically drawn away from the tightening or seating surface upon the cessation of the air pressure. Preferably this diaphragm is disposed in the relatively stationary part, but it is also possible to mount the diaphragm together with the pressure plug in the rotating member of the parts assembled in the hub of the wheel. In the case first mentioned with the diaphragm arranged in the stationary member the plug seating or tightening surface is provided on the rotatable member while, when the diaphragm is arranged in the rotatable member the plug seating surface is disposed in the relatively stationary part. By means of this diaphragm the plug is retained at a distance from the seating member, as long as there is no pressure on the diaphragm, but as soon as pressure is applied thereon the plug is quickly forced against its seating surface, the arrangement being such that the plug is always securely guided in its central position.

An embodiment of the principles of the invention is shown on the accompanying drawing in longitudinal section by way of exemplification. As appears from the drawing the tightening or seating surface $b$ for the plug $c$ is provided on the wheel hub $a$. The seating surface is in communication with the conduit leading to the tire by way of the bore or passage $d$. Upon the wheel hub $a$ the hub casing $e$ is mounted by means of the ball bearing $f$. The casing is retained on the hub by the tightening nut $g$. In a cylindrical recess $h$ of the casing the diaphragm $i$ is disposed which may consist of rubber, metal or the like. It is retained in its position by the threaded ring $k$. In a circular central aperture of this diaphragm $i$ the conical head $c$ of the plug is inserted which is retained on the diaphragm by means of the nut $l$ and an interposed washer. The cavity $m$ of the casing $e$ communicates with the bore or passage $n$ which is connected to the air pressure conduit. As soon as pressure is admitted into the cavity $m$ by way of the passage $n$ the diaphragm $i$ is forced out and vaulted in the direction of the hub, so that the plug cone $c$ is made to engage with the seating surface $b$. As soon as the pressure is relieved in the space $n$, the diaphragm $i$ will again remove the cone $c$ from its seating surface $b$. A passage $o$ in the plug cone $c$ provides communication between the space $m$ and the passage $d$ of the wheel hub. By the engagement of the cone $c$ with the seating surface $b$ any liability of loss of pressure to the outside incident to the flow of the air under pressure from the space $m$ into the conduit $d$ and thence into the tire is avoided.

The invention has been shown and described herein in its broad features only, but it is obvious that it is susceptible of modifications without deviating from the spirit of the invention as expressed in the annexed claim.

I claim:—

An anti-leakage device of the character described comprising a substantially cylindrical member having an axially disposed bore and a fluid passage communicating with said bore, said bore being provided at one end thereof with a conical seat, a cap member mounted on said cylindrical member and rotatable with respect thereto and provided with a fluid passage leading thereinto, an axially apertured diaphragm separating the fluid passages, and an axially apertured plug secured to said diaphragm and having a conical portion adapted to cooperate with said seat.

In testimony whereof I affix my signature.

KURT SCHMIDT.